(12) United States Patent
Langenfeld

(10) Patent No.: US 7,396,310 B1
(45) Date of Patent: Jul. 8, 2008

(54) HYDROSTATIC TRANSAXLE

(75) Inventor: Thomas J. Langenfeld, Sullivan, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 0 days.

(21) Appl. No.: 11/740,092

(22) Filed: Apr. 25, 2007

Related U.S. Application Data (63) Continuation of application No. 11/316,647, filed on Dec. 21, 2005, now Pat. No. 7,210,294.

(51) Int. Cl.
*F16H 48/06* (2006.01)
(52) U.S. Cl. .................................... 475/230
(58) Field of Classification Search ............. 475/230, 475/231
See application file for complete search history.

(56) References Cited

U.S. PATENT DOCUMENTS

| | | | |
|---|---|---|---|
| 1,430,367 A * | 9/1922 | Ford ............... 475/229 |
| 1,840,874 A | 1/1932 | Rayburn | |
| 2,474,706 A | 6/1949 | Wahlmark | |
| 3,654,761 A | 4/1972 | Eickmann | |
| 3,969,876 A | 7/1976 | Turos | |
| 4,182,201 A | 1/1980 | Mayhew et al. | |
| 4,468,981 A | 9/1984 | Ries | |
| 4,889,621 A | 12/1989 | Yamada et al. | |
| 4,979,583 A | 12/1990 | Thoma et al. | |
| 4,987,796 A | 1/1991 | von Kaler et al. | |
| 5,015,221 A * | 5/1991 | Smith ............... 475/19 |
| 5,090,949 A | 2/1992 | Thoma et al. | |
| 5,201,692 A | 4/1993 | Johnson et al. | |
| 5,259,194 A | 11/1993 | Okada | |
| 5,314,387 A | 5/1994 | Hauser et al. | |
| 5,373,697 A | 12/1994 | Jolliff et al. | |
| 5,394,699 A | 3/1995 | Matsufuji | |
| 5,515,747 A | 5/1996 | Okada et al. | |
| 5,555,727 A | 9/1996 | Hauser et al. | |
| 5,613,409 A | 3/1997 | Hauser | |
| 5,622,051 A | 4/1997 | Iida et al. | |
| 5,626,204 A | 5/1997 | Johnson | |
| 5,644,954 A | 7/1997 | Matsufuji | |
| 5,709,084 A | 1/1998 | Krantz | |
| 5,802,851 A | 9/1998 | Krantz | |
| 5,807,200 A | 9/1998 | Hauser | |
| 5,839,327 A | 11/1998 | Gage | |
| 5,957,229 A | 9/1999 | Ishii | |
| 6,073,443 A | 6/2000 | Okada et al. | |
| 6,212,887 B1 | 4/2001 | Takada | |
| 6,233,929 B1 | 5/2001 | Okada et al. | |
| 6,280,613 B1 | 8/2001 | Morse et al. | |

(Continued)

*Primary Examiner*—Ha D. Ho
(74) *Attorney, Agent, or Firm*—Neal, Gerber & Eisenberg LLP (57) ABSTRACT

A differential assembly for driving a pair of axle shafts includes a drive gear located in a housing and having at least one pair of symmetrically disposed slots formed therein. A pair of differential bushings are located in the housing on opposite sides of the drive gear. A pair of differential carriers extend through the drive gear, each carrier having its end portions engaged to notches formed in the differential bushings. The differential carriers further include a center key engaging the slots in the drive gear, whereby the carriers and bushings rotate with the drive gear. The interaction of the bushings with the carriers retains the carriers in engagement with the drive gear.

20 Claims, 11 Drawing Sheets

U.S. PATENT DOCUMENTS

| | | |
|---|---|---|
| 6,322,474 B1 | 11/2001 | Hauser et al. |
| 6,341,489 B1 | 1/2002 | Iida |
| 6,361,467 B1 * | 3/2002 | Chen .......................... 475/247 |
| 6,401,568 B1 | 6/2002 | Hauser et al. |
| 6,478,709 B1 * | 11/2002 | Irwin et al. ................. 475/230 |
| 6,575,868 B1 | 6/2003 | Keusch et al. |
| 6,616,565 B1 * | 9/2003 | Chen et al. .................. 475/230 |
| 6,626,065 B2 | 9/2003 | Arnold et al. |
| 6,637,293 B1 | 10/2003 | Hauser et al. |
| 6,779,421 B2 | 8/2004 | Arnold et al. |
| 6,780,137 B1 | 8/2004 | Langenfeld |
| 6,843,747 B1 | 1/2005 | Phanco et al. |
| 7,210,294 B1 | 5/2007 | Langenfeld et al. |

* cited by examiner

HYDROSTATIC TRANSAXLE

CROSS-REFERENCE

This application is a continuation of U.S. patent application Ser. No. 11/316,647 filed on Dec. 21, 2005 and now U.S. Pat. No. 7,210,294. This prior application is incorporated herein in its entirety by reference

BACKGROUND OF THE INVENTION

This invention relates to a hydrostatic transaxle for use in vehicles, industrial applications or other applications.

SUMMARY OF THE INVENTION

A hydrostatic transaxle is disclosed herein. Among the features of the transaxle design disclosed herein are an improved internal expansion chamber for management of the hydraulic fluid, an improved differential assembly and a shield for an external oil filter with a means for preventing the oil filter from being removed inappropriately.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
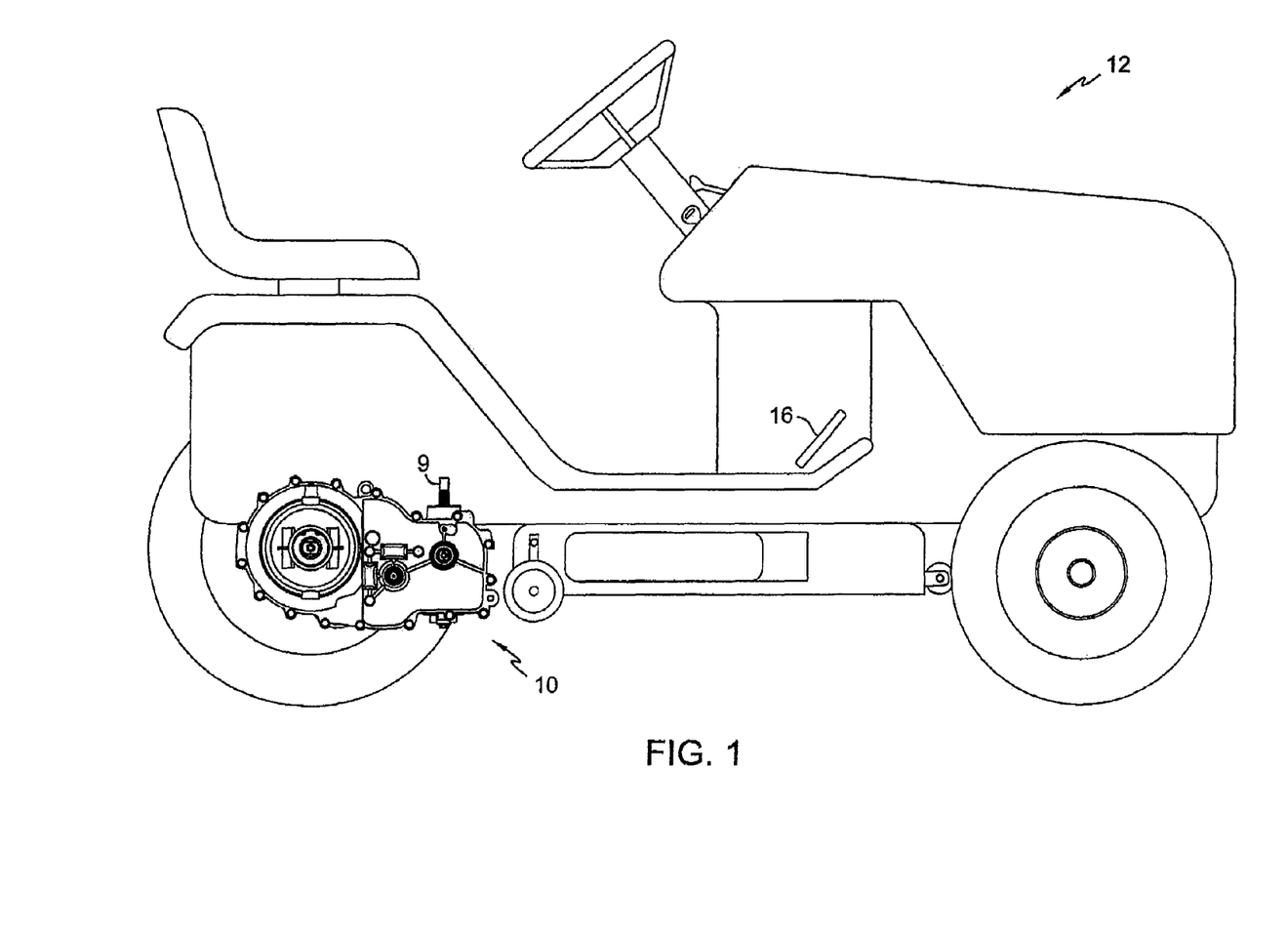
FIG. 1 is a side elevation view of an exemplary vehicle incorporating a transaxle in accordance with the present invention.
Figure 2:
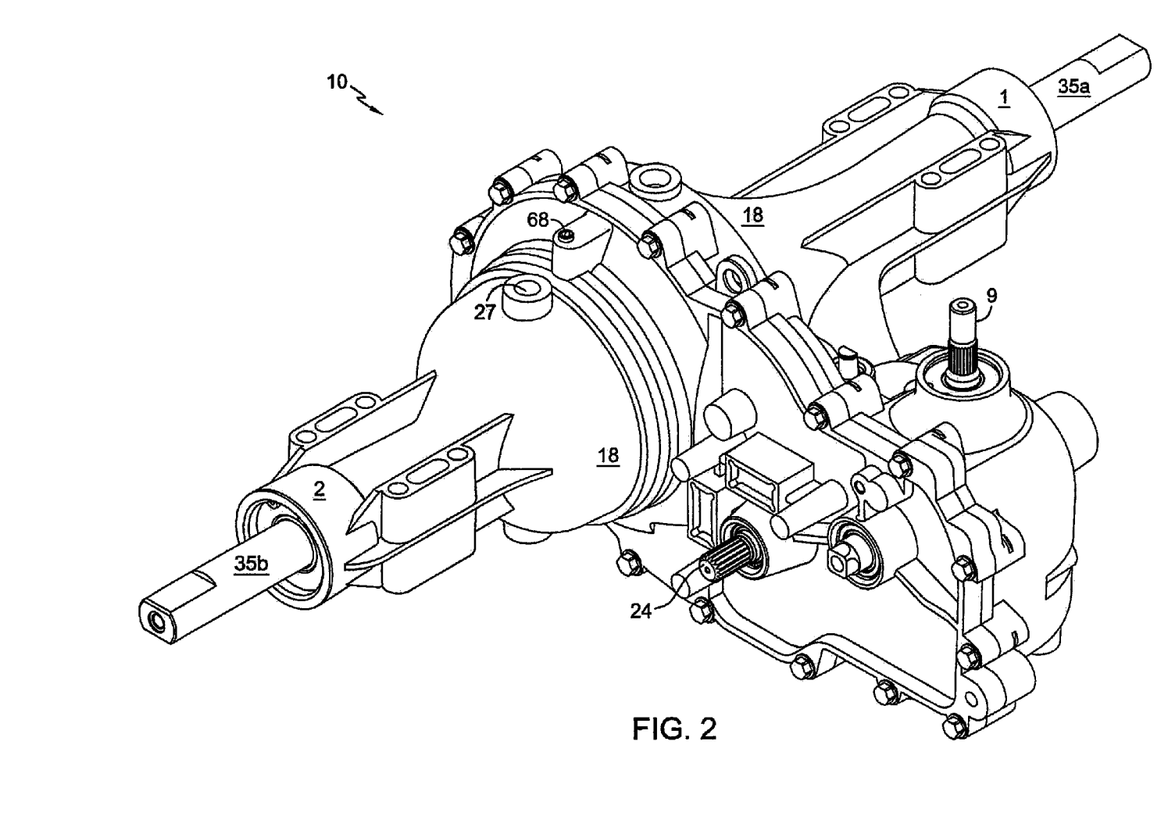
FIG. 2 is a perspective, external view of the transaxle in accordance with the present invention.
Figure 3:
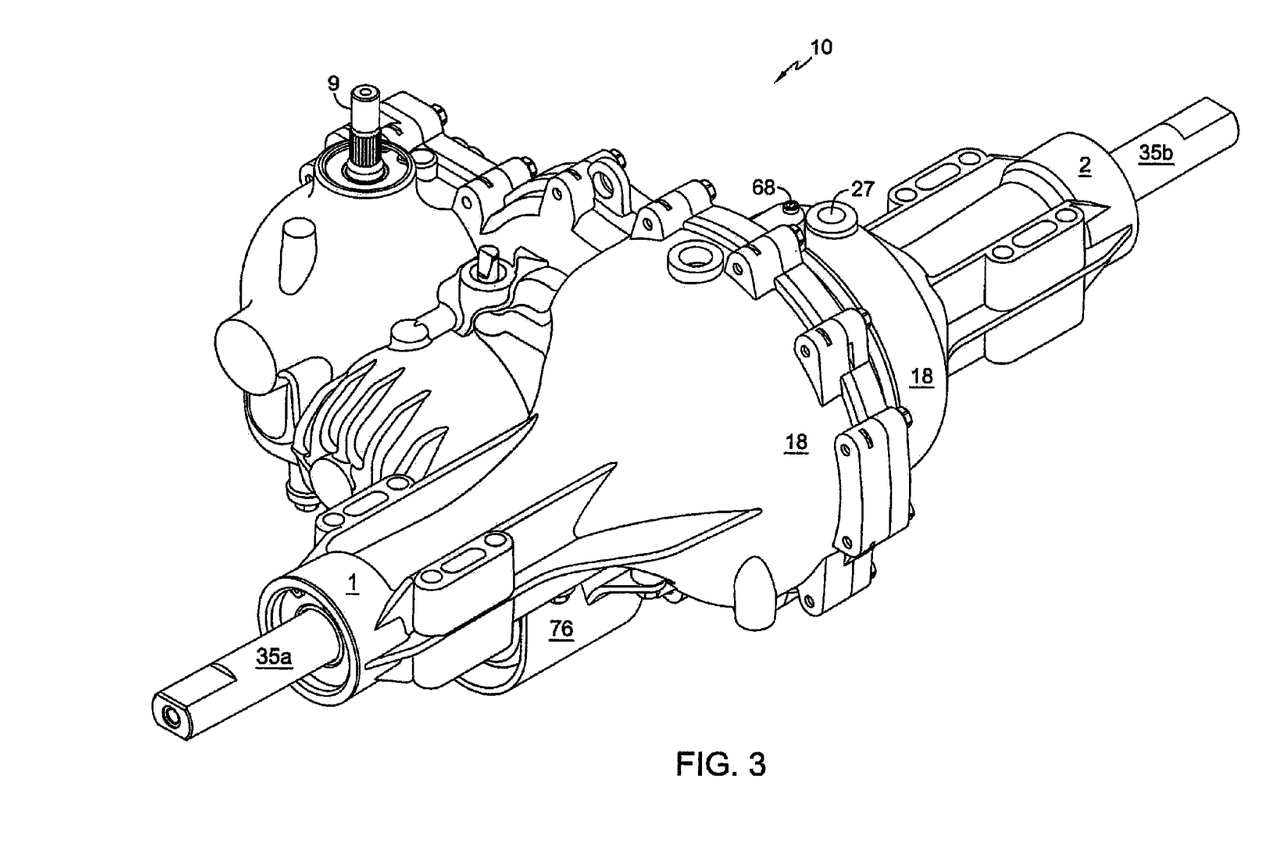
FIG. 3 is an opposite perspective, external view of the transaxle shown in FIG. 2.

FIGS. 1-3 depict transaxle 10 used in connection with an exemplary application, namely vehicle 12, which is depicted herein as a riding tractor for use as a yard tractor, lawn mower or similar application. A control arm (not shown) is connected by way of linkages (not shown) to pedal system 16. The control mechanisms and similar external features are not critical to this invention and other such control mechanisms are known in the art.

Figure 4:
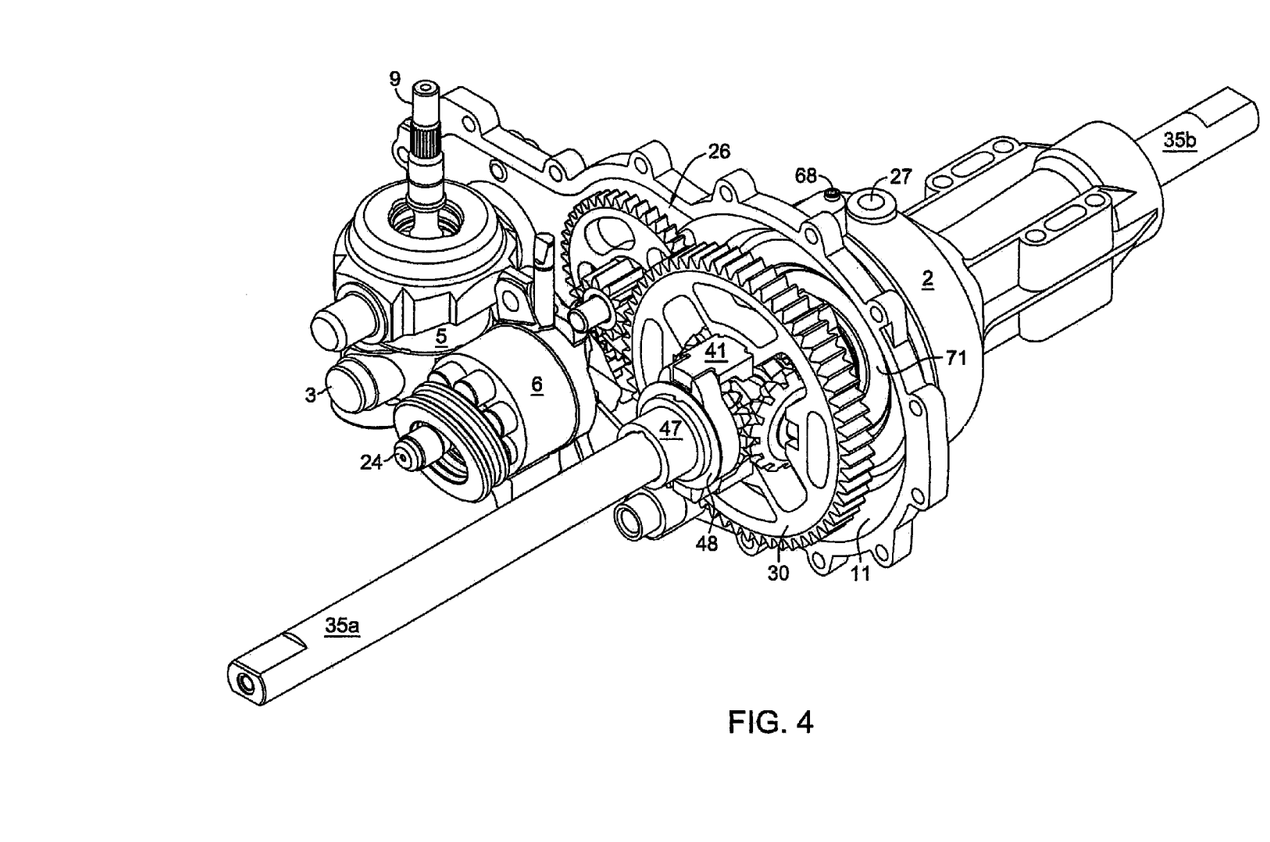
FIG. 4 is a perspective view of the transaxle shown in FIG. 3 with one housing member removed to show certain of the hydraulic and gearing components of the transaxle.

The internal hydraulic workings of transaxle 10 are similar in many ways to the transaxle depicted in commonly owned U.S. Pat. No. 6,253,637, and U.S. application Ser. No. 11/126,785, the terms of which are incorporated herein by reference. Referring now to FIG. 4, in general, a pump cylinder block 5 is located on center section 3 and rotatably driven by pump input shaft 9. Motor cylinder block 6 is also located on center section 3 and connected to pump cylinder block 5 through hydraulic porting (not shown) in center section 3. These hydraulic units are mounted inside main sump 11 formed inside housing elements 1 and 2 joined along a vertical split line, where the vertical split line is perpendicular to the axis of axles 35a and 35b. Motor shaft 24 is engaged to and driven by motor cylinder block 6 and drives a gear train 26, which is then connected to and drives a differential 30. Each housing element 1, 2 comprises an axle horn 18 through which one of axles 35a, 35b extend.

The invention disclosed herein may be used in connection with other drive apparatuses. In addition, various bearings, spacers, seals and similar items are depicted in the figures but not described in detail as the operation and assembly of such an integrated hydrostatic transaxle will be known to those of skill in the art. In addition, there are different embodiments described herein; to the extent there are identical or substantially identical structure used in these embodiments, identical or like reference numerals are used.

Figure 5:
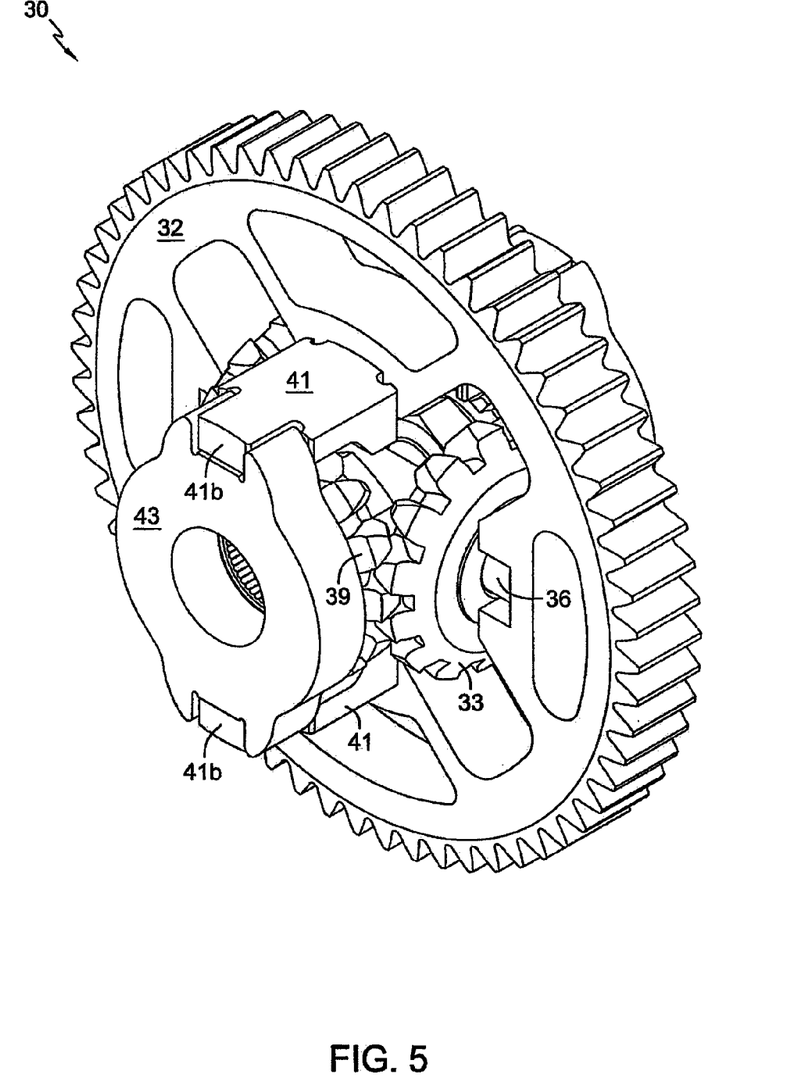
FIG. 5 is a perspective view of the differential used in the transaxle shown in FIG. 4, in accordance with one embodiment of this invention.
Figure 6:
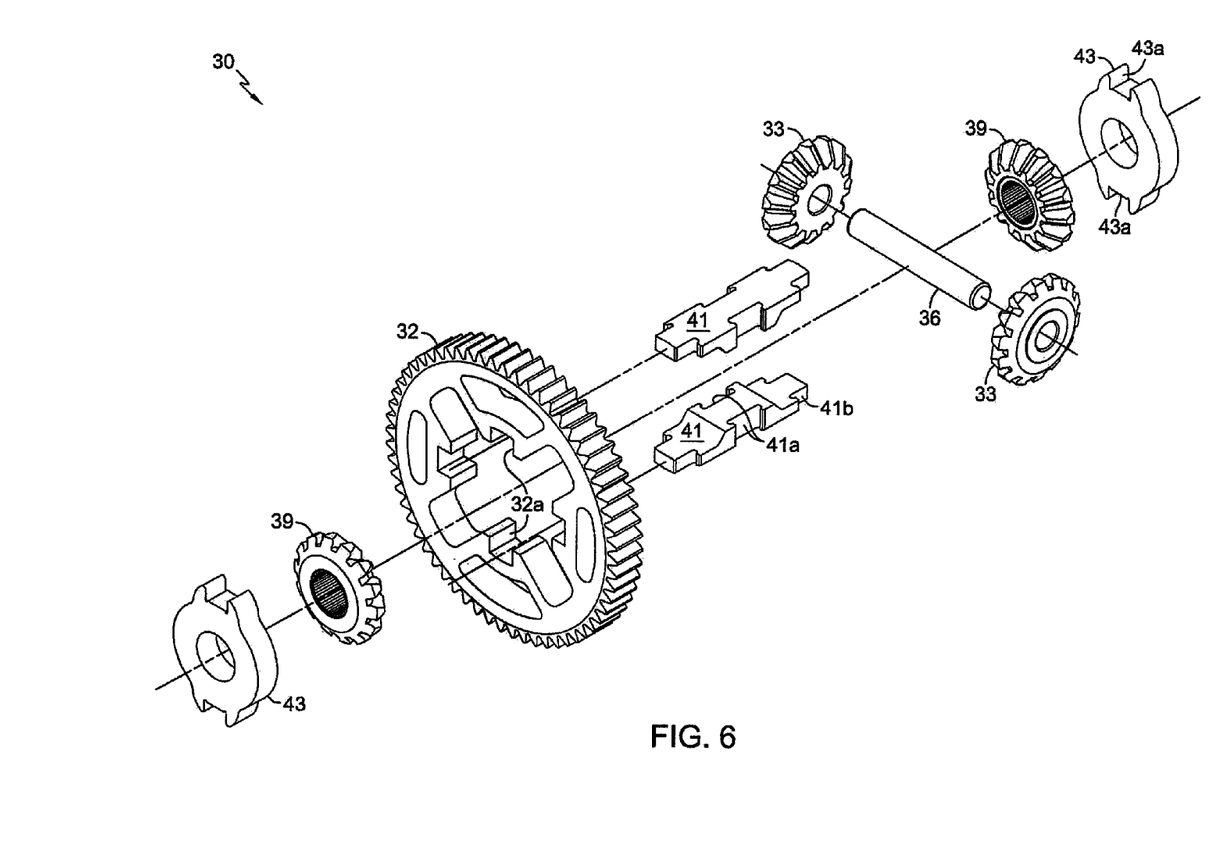
FIG. 6 is an exploded view of the components of the differential shown in FIG. 5.

Differential 30 is shown most clearly in FIGS. 5 and 6 and comprises a spur or bull gear 32 which is driven by gear train 26. A pair of planet bevel gears 33 are rotatably mounted on cross shaft 36 and engaged to a pair of axle bevel gears 39 that are mounted on and drive axles 35a and 35b. Two differential carriers 41 extend through the center opening of gear 32 and include two center key regions 41a to engage corresponding openings 32a on bull gear 32.

Bushings 43 are mounted on opposite sides of differential 30, each adjacent one of the axle bevel gears 39. Each bushing 43 includes a pair of notches 43a which are shaped to engage end portions 41b of the two differential carriers 41. These elements, including differential carriers 41, bushings 43 and bull gear 32 preferably are not locked together; rather the arrangement described herein assists in maintaining the spatial orientation of the various components. This configuration uses simple, inexpensive parts and does not require any fasteners.

Differential carriers 41 cooperate with center openings 32a in bull gear 32 and notches 43a in differential bushings 43 to keep bull gear 32 generally centered between bushings 43 and consequently between interior surfaces of housing elements 1, 2. By keeping bull gear 32 centered between bushings 43, bull gear 32 will be positioned to engage an element of gear train 26. End portions 41b are shorter than the width of differential bushings 43. Thus, any forces from differential 30 that would tend to force differential 30 or its components along the axis of axles 35a, 35b is absorbed by differential bushings 43. Differential bushings 43 then thrust against an axle bearing 47, one of which is located in each housing 1, 2. A washer 48 may be positioned between differential bushing 43 and axle bearing 47.

The need for an expansion chamber is well known in the art and this invention discloses a simplified design of an internal expansion tank or chamber. Known designs are shown in commonly owned U.S. Pat. No. 6,843,747 and, as disclosed therein, include external tanks using a siphon or an internal plate secured to an inner surface of the housing to form an internal expansion chamber. An improved internal expansion chamber is depicted herein and, in particular, in FIGS. 7-10, where an expansion chamber 28 is formed in one of axle horns 18. It will be understood that the expansion chamber as disclosed herein could also be used in a transaxle having only a single axle and corresponding axle horn, with no differential, such as in a zero turn drive machine.

Figure 7:
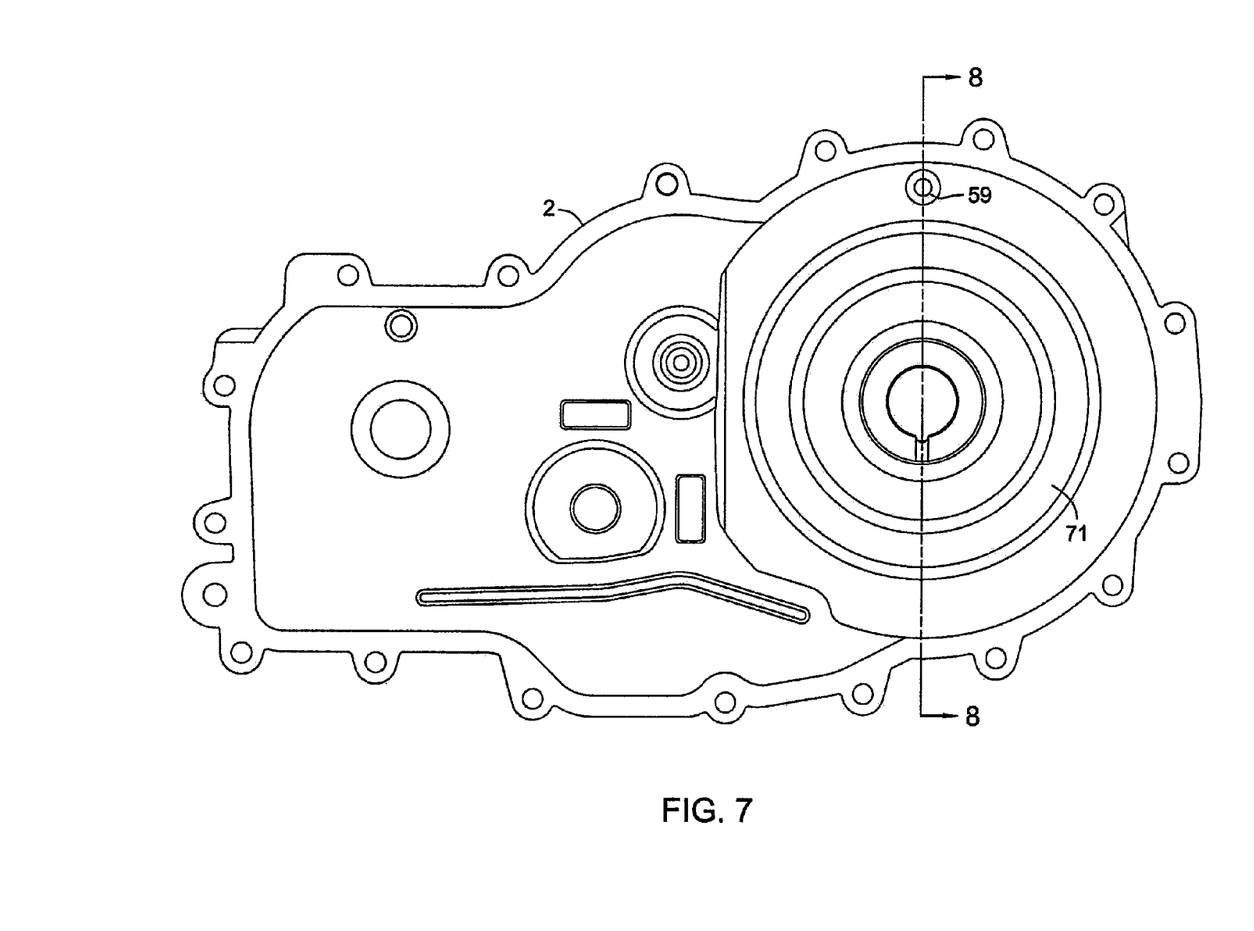
FIG. 7 is an elevational view of the transaxle housing component shown in FIG. 4, showing details of an internal expansion chamber in accordance with one embodiment of this invention.
Figure 8:
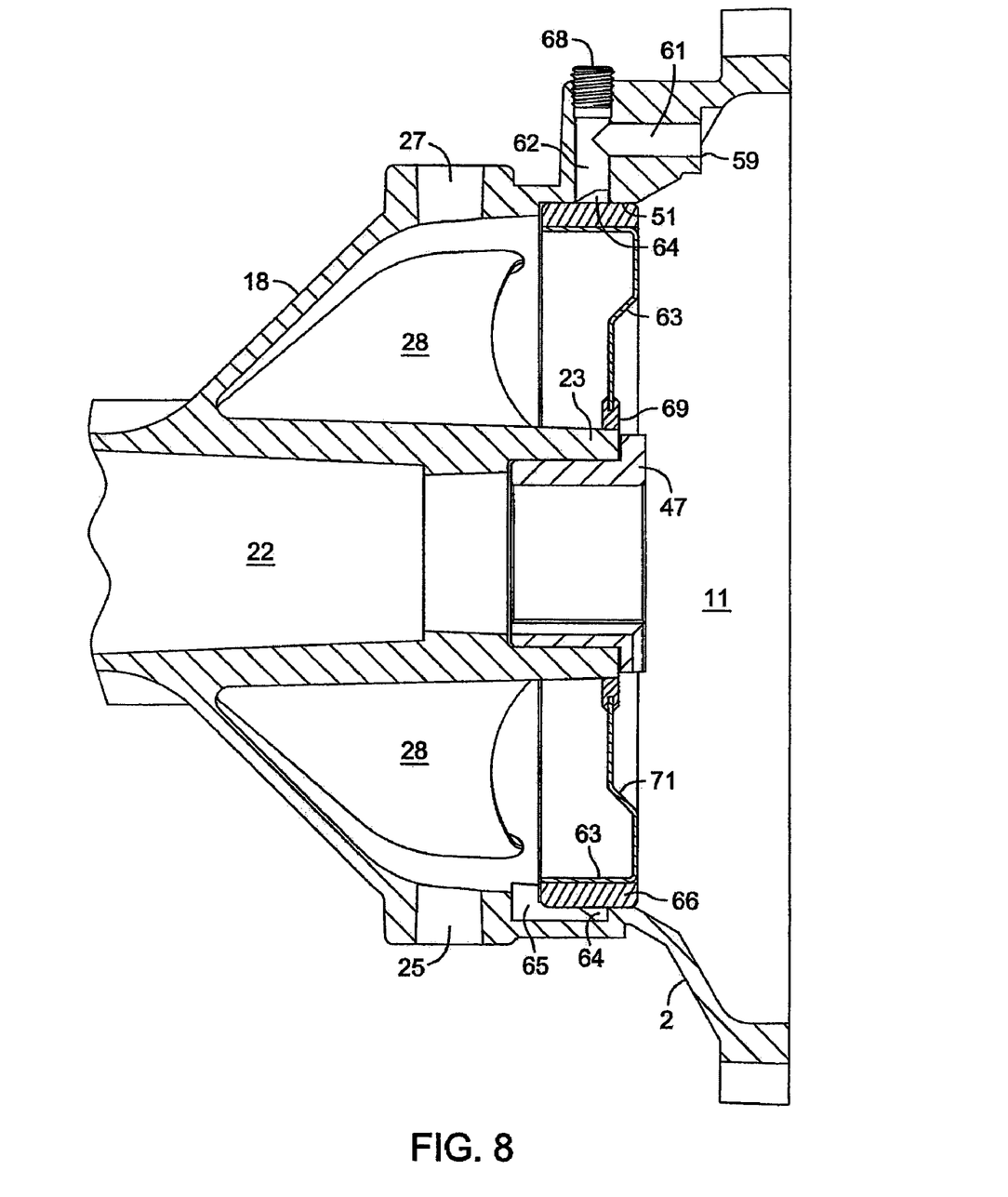
FIG. 8 is a cross-sectional view along the lines 8-8 of FIG. 7.
Figure 9:
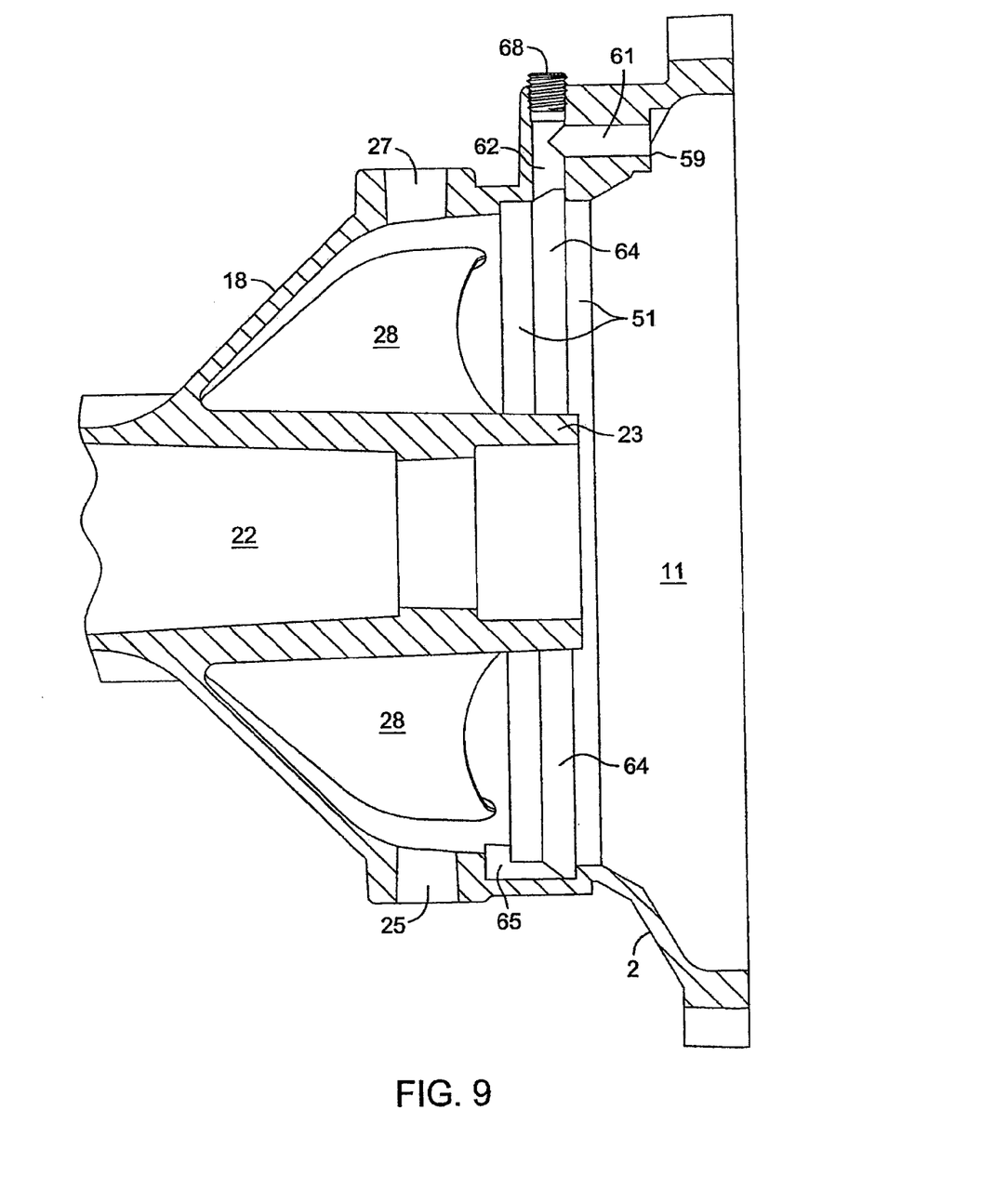
FIG. 9 is a cross-sectional view similar to FIG. 8 with certain elements removed for clarity.

FIG. 7 depicts the internal structure of housing element 2. As shown in FIG. 8, axle receiving area 22 is formed inside horn 18 to receive axle 35b. Expansion area 28 is also formed internal to axle horn 18 and extends around the outer circumference of axle receiving area 22 and is thus formed partially by surfaces of these features, eliminating the need for a portion of the structure which would be required to create a separate expansion chamber. Drain 25 is formed at the bottom of axle horn 18 to permit hydraulic fluid to be drained from expansion sump 28 if needed, and vent 27 is formed at the top to provide the desired venting to the atmosphere. As will be described in more detail below, opening 59 and passages 61, 62, 64 and 65 act as a conduit to hydraulically connect main sump 11 and expansion sump 28 as a siphon.

Hydraulic fluid in main sump 11 will generally be above the level of opening 59 and the operation of the siphon as described herein and the pressure differential between main sump 11 and expansion sump 28 permit fluid movement between the two sumps. Expansion sump 28 will preferably always retain at least a certain amount of hydraulic fluid therein, above the level of passage 65. As the hydraulic fluid expands in main sump 11 through heating, it flows through opening 59 to horizontal passage 61 and then to vertical passage 62. As will be understood, passages 61 and 62 are preferably bored into housing element 2, and cap or plug 68 is used to close off vertical passage 62. A groove 64 is formed in radial surface 51 of housing element 2 and extends in an arc around at least a portion of the circumference thereof; groove 64 can be seen most clearly in FIG. 9, where other elements have been removed for clarity. It is preferred to form groove 64 as a semicircle within housing element 2, rather than extending around the entire periphery of radial surface 51. The specific location of radial surface 51 will depend on the shape of housing 2 or axle horn 18 and is not critical to the invention.

As shown in FIG. 8, seal 71 is positioned between a radial surface formed on bearing seat 23 and radial surface 51 such that groove 64 is enclosed except where vertical passage 62 and passage 65 intersect groove 64. Seal 71 may be of a variety of configurations and acts as a cap or other sealing member to separate main sump 11 from expansion sump 28.

As shown, seal 71 comprises an annular, rigid frame portion 63, often known as a can, with a rubber, sealant or other elastomeric material forming periphery 66 and a rubber, sealant or other elastomeric material forming an interior interface 69 against the radial surface on bearing seat 23. Seal 71 need not be annular to accomplish the goals of the invention; for example, it need not extend completely around the entire internal surface of housing 2; it simply needs to provide a channel around a peripheral portion between main sump 11 and expansion sump 28. Siphon path 64 need not be arcuate since the interior profile of housing 2 need not be arcuate. The profile of seal 71 simply needs to mate with and form a seal against radial surface 51 and bearing seat 23.

In the embodiment depicted, periphery 66 and interior interface 69 work to limit fluid communication between sump 11 and expansion sump 28 to flow through passages 61, 62, 64 and 65. Thus, as hydraulic fluid in sump 11 expands through heating, it travels from vertical passage 62 into passage 64. The fluid then travels around the circumference of seal 71 to lower passage 65, which connects with expansion sump 28. The fluid flow passages described above will operate as a siphon to return hydraulic fluid from expansion sump 28 to main sump 11 when the unit cools. Thus, when the oil pressure in main sump 11 decreases, the siphoning action will pull fluid back from expansion sump 28 through lower horizontal passage 65 to groove 64 and then back out to main sump 11 through passages 62 and 61.

Figure 10:
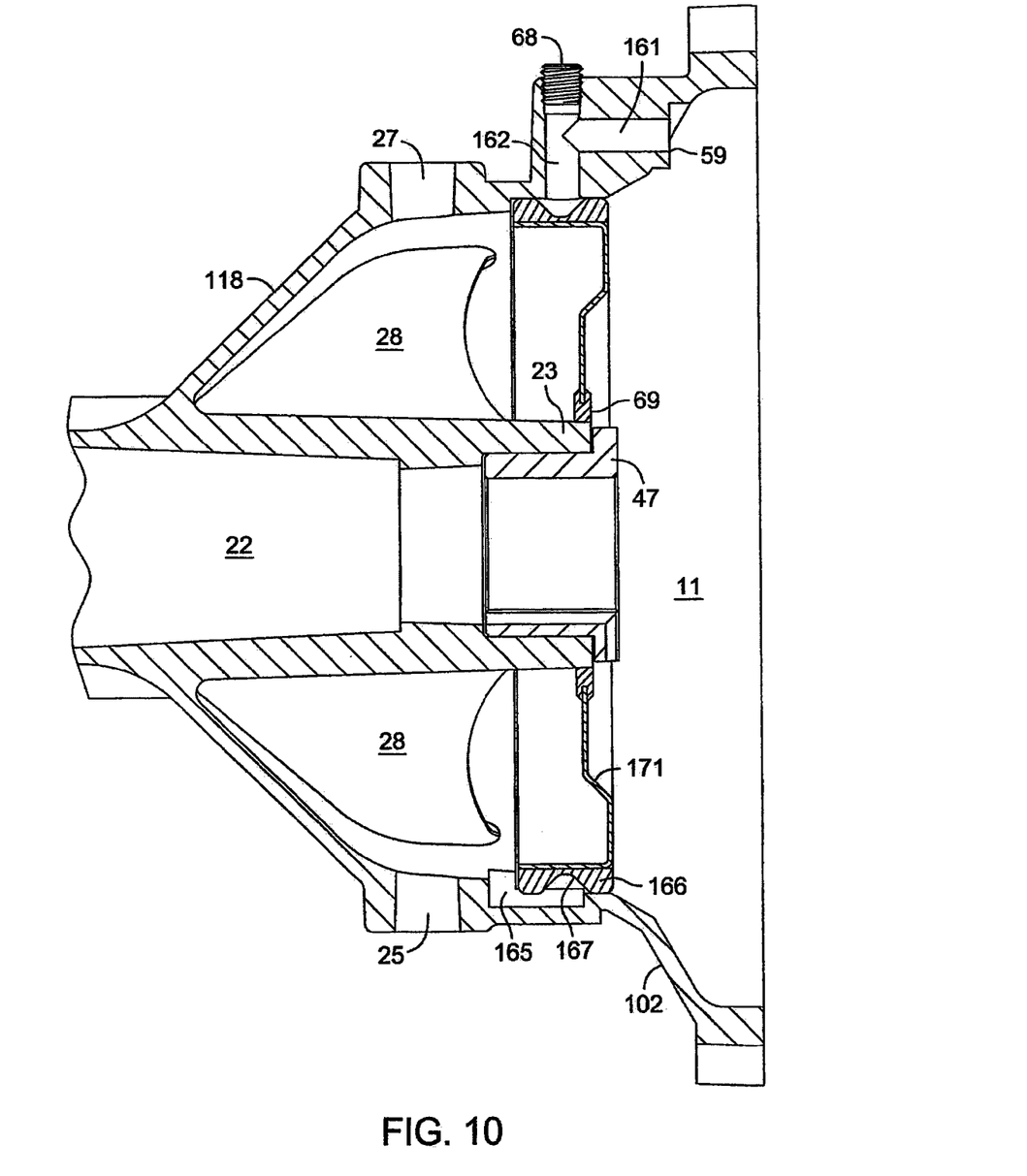
FIG. 10 is a cross-sectional view similar to FIG. 8 showing details of an internal expansion chamber in accordance with an alternative embodiment of this invention.

FIG. 10 shows an alternative embodiment of the internal expansion chamber feature, where the primary difference is that the fluid flow channel formed by groove 167 is created directly in rubber or elastomeric periphery 166 and not in housing 102 or axle horn 118. Forming groove 167 in periphery 166 eliminates the need to form a separate channel in a housing member, thereby reducing costs. In this embodiment, the flow through passages 161, 162, 167 and 165 is similar to that described above.

Figure 11:
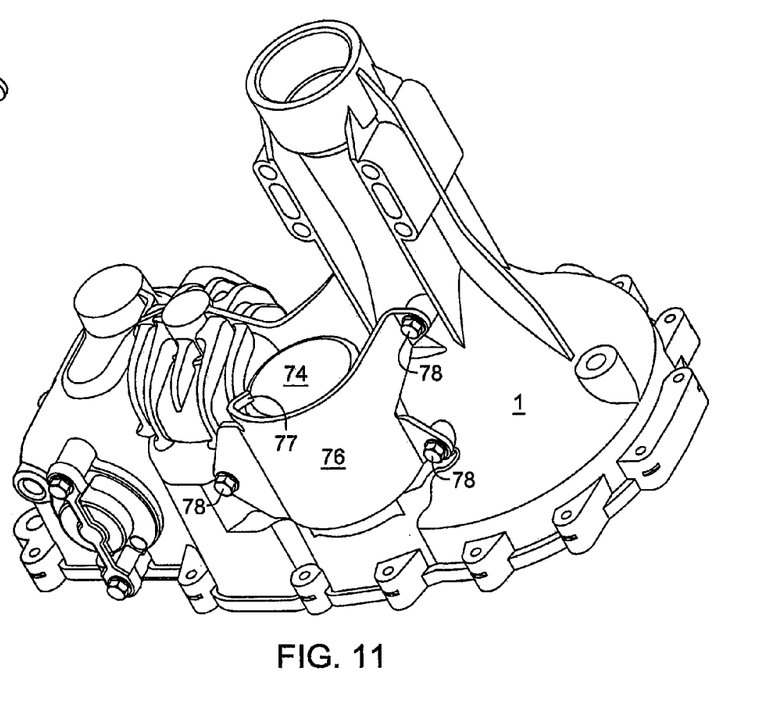
FIG. 11 is a bottom, perspective view of a portion of the transaxle of FIG. 2 showing an oil filter and shield in accordance with an embodiment of the present invention.
Figure 12:
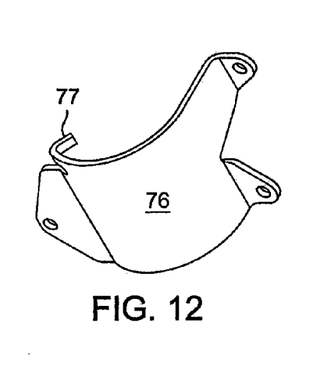
FIG. 12 is a perspective view of the oil filter shield shown in FIG. 11.

Another feature of the present design is shown in FIGS. 11 and 12; as is known in the art, oil filter 74 is attached to the external surface of housing element 1, preferably by means of screw threads or a similar connection. Thus, oil filter 74 can be easily changed by the end user, as is generally desired. Shield 76 is connected to housing element 1 by means of fasteners 78 or other attachment means and protects oil filter 74 from being dislodged or damaged by contact with curbs, rocks, debris or the like. During operation, it is likely that debris such as dirt, lawn clippings and the like will collect in the area between oil filter 74 and shield 76. This creates a problem if oil filter 74 is removed with shield 76 still in place, as it is likely that the trapped debris will work its way into the opening (not shown) between oil filter 74 and main sump 11. Such contamination in sump 11 would damage the hydraulic drive apparatus and must be avoided. Thus, shield 76 is provided with a tab 77 adjacent to the end of filter 74 and prevents the user from removing filter 74 without first removing shield 76. Once shield 76 is removed a user may then clean the area around filter 74 prior to removing filter 74.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A differential assembly for driving a pair of axle shafts disposed in a housing, the differential assembly comprising:
    a drive gear comprising a center opening and a first pair of symmetrically disposed slots formed in the center opening, each slot being open to the center opening;
    first and second differential bushings disposed in the housing on opposite sides of the drive gear, each differential bushing comprising a pair of notches formed on an external surface thereof;
    a first differential carrier extending through the drive gear and comprising a first end portion engaged to one of the pair of notches in the first differential bushing, a second end portion engaged to one of the pair of notches in the second differential bushing, and a center key located between the first end portion and second end portion, the center key engaging one of the first pair of symmetrically disposed slots in the drive gear; and
    a second differential carrier extending through the drive gear and comprising a first end portion engaged to the other of the pair of notches in the first differential bushing, a second end portion engaged to the other of the pair of notches in the second differential bushing, and a center key located between the first end portion and second end portion, the center key engaging the other of the first pair of symmetrically disposed slots in the drive gear.

2. The differential assembly of claim 1, further comprising a second pair of symmetrically disposed slots formed in the drive gear, a cross shaft engaged to the second pair of symmetrically disposed slots, and a first pair of rotatable bevel gears mounted on the cross shaft.

3. The differential assembly of claim 1, further comprising a second pair of bevel gears, each of the second pair of bevel gears being mounted on one of the axle shafts, and each axle shaft extends through the center of one of the differential bushings.

4. The differential assembly of claim 1, wherein the drive gear is a spur gear driven by a hydrostatic transmission.

5. A differential assembly for driving a pair of axle shafts disposed in a housing, the differential assembly comprising:
   a drive gear comprising a first pair of symmetrically disposed slots formed therein;
   first and second differential bushings disposed in the housing on opposite sides of the drive gear, each differential bushing comprising a pair of notches formed therein;
   a first differential carrier extending through the drive gear and comprising a first end portion engaged to one of the pair of notches in the first differential bushing, a second end portion engaged to one of the pair of notches in the second differential bushing, and a center key located between the first end portion and second end portion, the center key engaging one of the first pair of symmetrically disposed slots in the drive gear; and
   a second differential carrier extending through the drive gear and comprising a first end portion engaged to the other of the pair of notches in the first differential bushing, a second end portion engaged to the other of the pair of notches in the second differential bushing, and a center key located between the first end portion and second end portion, the center key engaging the other of the first pair of symmetrically disposed slots in the drive gear,
   wherein each differential carrier comprises a first side portion and a second side portion, and the center key of each differential carrier comprises a first slot formed on the first side portion and a second slot formed on the second side portion.

6. A differential assembly for driving a pair of axle shafts disposed in a housing, the differential assembly comprising:
   a drive gear;
   first and second differential carriers, each differential carrier engaged to and extending through the drive gear, whereby both differential carriers rotate with the drive gear;
   a first differential bushing supported on one of the pair of axle shafts and comprising a first side adjacent a first housing support surface and a second side opposite to the first side, wherein the first differential bushing is maintained in location on the one axle shaft in part by contact between its first side and the first housing support surface, and the first differential bushing is engaged to both of the differential carriers to cause the first differential bushing to rotate with the drive gear;
   a second differential bushing supported on the other axle shaft and comprising a first side adjacent a second housing support surface and a second side opposite to the first side, wherein the second differential bushing is maintained in location on the other axle shaft in part by contact between its first side and the second housing support surface, and the second differential bushing is engaged to both of the differential carriers to cause the second differential bushing to rotate with the drive gear; and
   a plurality of bevel gears disposed within an interior opening of the drive gear and between the two differential bushings.

7. The differential assembly of claim 6, further comprising a cross shaft supported by the drive gear, wherein a pair of the plurality of bevel gears is supported on the cross shaft.

8. The differential assembly of claim 6, wherein the drive gear is a spur gear driven by a hydrostatic transmission.

9. The differential assembly of claim 6, wherein the first differential carrier engages to the drive gear by means of a first slot and first mating feature and the second differential carrier engages to the drive gear by means of a second slot and second mating feature.

10. The differential assembly of claim 9, wherein the first and second slots are formed in the drive gear and each differential carrier comprises a key region shaped to fit within its respective slot in the drive gear, whereby the key regions form the first and second mating features.

11. The differential assembly of claim 6, wherein each differential carrier engages to each differential bushing by means of a notch and mating feature.

12. The differential assembly of claim 11, wherein the notches are formed in the differential bushing, and each differential carrier comprises a pair of opposing end portions forming the respective mating features, each end portion being shaped to fit within a respective notch on one of the differential bushings, whereby the end portions form the mating features.

13. The differential assembly of claim 6, wherein each housing support surface comprises an axle bearing engaged to one of the axle shafts and the housing.

14. The differential assembly of claim 13, wherein each housing support surface further comprises a washer disposed between the axle bearing and the bushing.

15. A differential assembly, comprising:
    a housing;
    a drive gear disposed in the housing and comprising a center opening;
    a pair of differential bushings disposed in the housing on opposite sides of the drive gear; and
    a pair of differential carriers extending through the center opening and driven by the drive gear, each of the pair of differential carriers separately engaged to both differential bushings to cause the differential bushings to be rotatable with the drive gear, wherein the interaction of the pair of differential bushings with the pair of differential carriers retains the differential carriers in engagement with the drive gear.

16. The differential assembly of claim 15, further comprising a cross shaft supported by the drive gear, and a pair of planet bevel gears rotatably supported on the cross shaft.

17. The differential assembly of claim 15, wherein each differential carrier engages to the drive gear by means of a slot and a mating feature engaging the slot.

18. The differential assembly of claim 17, wherein each respective slot is formed in the drive gear and each respective mating feature is a key region formed on each differential carrier.

19. The differential assembly of claim 15, wherein each differential carrier engages to each differential bushing by means of a notch and a mating feature engaging the notch.

20. The differential assembly of claim 19, wherein each respective notch is formed in the differential bushing and each respective mating feature is formed on an end portion of each differential carrier.

* * * * *